United States Patent Office 2,818,416
Patented Dec. 31, 1957

2,818,416

CYCLOMATIC COMPOUNDS

Jerome E. Brown and Hymin Shapiro, Detroit, and Earl G. De Witt, Royal Oak, Mich., assignors to Ethyl Corporation, New York, N. Y., a corporation of Delaware No Drawing. Application December 10, 1952
Serial No. 325,224

9 Claims. (Cl. 260—429)

The instant invention relates to a broad class of novel organometallic compounds and processes for their manufacture. More particularly, the present invention relates to novel and useful metallic cyclomatic compounds.

This application is a continuation-in-part of our earlier filed copending application Serial No. 307,374, filed August 30, 1952, now abandoned.

As will be apparent from the discussion hereinafter the metallic cyclomatic compounds of the present invention comprising a novel class of organometallic compounds have properties which render them of particular utility as additives. In the preparation of organometallic compounds for such use, the properties of stability, volatility, and solubility are of considerable importance. Stability is important because additives having low stabilities often decompose in the presence of water, atmospheric constituents such as oxygen and carbon dioxide and other gases frequently encountered such as sulfur dioxide and hydrogen sulfide. The importance of thermal stability becomes apparent from the fact that the resulting fuel or lubricant compositions frequently encounter diverse conditions of temperature such as those prevalent in tropic, temperate, and arctic regions as well as seasonal fluctuations in temperature in a specific region. Solubility is of considerable importance in obtaining homogeneous compositions which remain compatible during long periods of storage. The importance of volatility is apparent from a consideration of the fact that volatility has considerable influence on engine inductibility, that is, the character of a fuel composition to readily undergo operations such as carburetion, manifolding and injection utilized to introduce or induct such compositions into internal combustion engines.

But for a few noteworthy substances such as tetraethyllead and iron carbonyl, the state of the art has not advanced sufficiently to permit the preparation and isolation of "tailor made" organometallic substances having the necessary characteristics of stability, volatility, and solubility. It is evident, therefore, that the state of the art will be greatly enhanced by providing a class of organometallic compounds capable of being modified to meet the requirements of fuel and oil additives. Likewise, a noteworthy contribution to the art will be a method for the preparation of such compounds.

It is, therefore, an object of this invention to provide as new compositions of matter a novel class of organometallic compounds. Likewise, it is an object of this invention to provide processes for the preparation of these new compositions of matter. An additional object of the present invention is to provide a class of metallic cyclomatic compounds of particular utility as fuel additives. In addition, it is an object of this invention to provide a class of metallic cyclomatic compounds of considerable utility as additives to unctuous solvents. Other important objects of the instant invention will become apparent from the discussion hereinafter.

We have now found that the above and other objects of the present invention can be accomplished by providing as new compositions of matter cyclomatic compounds having the general formula $$MA_xB_yC_z$$

wherein M is a metal, A is a cyclomatic radical, and each of B and C can be the same or different and is an electron donating group such that $a_n + 5x + py + qz = S$, wherein S is the atomic number of an inert gas of the $n$th period, $x$ is a small whole integer from 1 to 4 inclusive, $y$ is a small whole integer from 1 to 4 inclusive, $z$ is a small whole integer from 0 to 4 inclusive, $n$ is a period of the periodic table and is greater than 1, $p$ and $q$ are the number of electrons donated by B and C respectively, and $a_n$ is the atomic number of M and is defined such that $a_n$ is within the parameters $(S_{n-1}+1)$ and $(S_n-6)$.

Reference to the generic formula described hereinabove indicates that there are three primary constituents of the new compositions of matter of the present invention. These are the metallic constituent designated as M, the cyclomatic radical designated as A, and an electron donating group designated as B. In certain embodiments of the novel cyclomatic compounds of the present invention there are two electron donating groups, B and C. Therefore, before attempting a further amplification of the nature of the compounds of the present invention it appears efficacious to consider each of these primary constituents in considerable detail.

The metallic portion of the cyclomatic compounds of the present invention can, perhaps, be best defined in terms of the periodic table. Therefore, the metallic constituent of the novel class of cyclomatic compounds of the present invention can comprise the elements of groups 1A, 1B, 2A, 2B, 3B, including the lanthanum series of rare earth elements, that is, those elements having an atomic number between 58 and 71 inclusive, and also those elements of the actinium series which are those elements having an atomic number of at least 90; 4B, 5B, 6B, 7B, and 8.

Thus, the metallic constituent of the novel cyclomatic compounds of the present invention can be a metallic element of group 1A of the periodic table, that is, lithium, sodium, potassium, rubibidium, caesium, and francium. Likewise, the metallic constituent can be an element comprising copper, silver and gold, that is, an element of group 1B of the periodic table. Similarly, the elements of group 2B of the periodic table can be employed in the novel cyclomatic compounds of the instant invention. Thus, M in the general formula presented hereinbefore can be beryllium, magnesium, calcium, strontium, barium, and radium. Likewise, the metallic constituent of our new compositions of matter can be zinc, cadmium, and mercury, that is, an element of group 2B of the periodic table. Moreover, the elements of group 3B of the periodic table, to wit: scandium, yttrium, lanthanum, actinium, and the elements of the lanthanide and actinide series of rare earth elements, that it, those elements having respectively atomic numbers from 58 to 71 inclusive, and those elements having an atomic number of at least 90 can be utilized in the compounds of the present invention. Likewise, the group 4B elements, titanium, zirconium, and hafnium can be present in the novel cyclomatic compounds of this invention. Vanadium, niobium, and tantalum, the elements of group 5B of the periodic table, can, likewise, be present in the compounds of our invention. Similarly, the 6B elements comprising chromium, molybdenum, and tungsten can be employed in our new compositions of matter. In addition, the novel cyclomatic compounds of this invention can contain the elements represented by group 7B of the periodic table, that is, the elements manganese, technetium, and rhenium. Similarly, the elements comprising group 8 of the periodic table, that is, iron, cobalt, nickel, ruthenium, rhodium, palladium, osmium, iridium, and platinum can be employed in the new and novel metallic cyclomatic compounds of this invention.

The second primary constituent of the new compositions of matter of the present invention designated by the symbol A in the general formula presented hereinbefore comprises a cyclomatic radical, that is, a cyclopentadiene-type radical which is a radical containing the cyclopentadienyl moiety. In general, such cyclomatic groups can be represented by the four generic formulae presented hereinafter. However, before presenting further illustrative examples of the four general types of cyclomatic radicals, a discussion of the term "organic radical" appears in order.

As will become apparent from the discussion relating to cyclomatic radicals, it appears advantageous to fully define the term "organic radical" at this point for the sake of brevity. The term "organic radicals" includes univalent aliphatic, alicyclic, or aromatic radicals. By the term univalent aliphatic radical is intended a univalent radical derived from an open chain saturated or unsaturated carbon compound, that is, an acyclic radical. The term univalent alicyclic radical denotes a monovalent radical derived from the corresponding aliphatic compounds by ring formation. The term univalent aromatic radical denotes a monovalent radical derived from a compound of the benzene series containing a ring with the peculiar type of unsaturation inherent in such aromatic compounds.

When a cyclomatic radical of the compounds of our invention is substituted with univalent aliphatic radicals, these substituents can be a radical selected from the group consisting of alkyl, alkenyl, aralkyl and aralkenyl. Thus, when these substituents are univalent aliphatic radicals they can be alkyl radicals such as, for example, methyl, ethyl, n-propyl, isopropyl, n-butyl, isobutyl, sec-butyl, t-butyl, n-amyl, and the various positional isomers thereof as, for example, 1 - methyl - butyl, 2 - methyl-butyl, 3 - methyl - butyl, 1,1 - dimethylpropyl, 1,2 - dimethyl - propyl, 2,2 - dimethylpropyl, and 1 - ethyl-propyl, and likewise the corresponding straight and branched chain isomers of hexyl, heptyl, octyl, nonyl, decyl, undecyl, dodecyl, tridecyl, tetradecyl, pentadecyl, hexadecyl, heptadecyl, octodecyl, nondecyl, eicosyl and the like. Likewise, the univalent aliphatic substituent of the cyclomatic radicals of the compounds of the present invention can be an alkenyl radical such as, for example, ethenyl, $\Delta^1$-propenyl, $\Delta^2$-propenyl, isopropenyl, $\Delta^1$-butenyl, $\Delta^2$-butenyl, $\Delta^3$-butenyl, and the corresponding branched chain isomers thereof as, for example, $\Delta^1$-isobutenyl, $\Delta^2$-isobutenyl, $\Delta^1$-sec-butenyl, $\Delta^2$-sec-butenyl, including 1-methylene-$\Delta^2$-propenyl, $\Delta^1$-pentenyl, $\Delta^2$-pentyl, $\Delta^3$-pentyl, $\Delta^4$-pentenyl, and the corresponding branched chain isomers thereof; $\Delta^1$-hexenyl, $\Delta^2$-hexenyl, $\Delta^3$-hexenyl, $\Delta^4$-hexenyl, $\Delta^5$-hexenyl, and the corresponding branched chain isomers thereof, including, 3,3-dimethyl-$\Delta^1$-butenyl; 2,3 - dimethyl-$\Delta^1$ - butenyl; 2,3-dimethyl-$\Delta^2$-butenyl; 2,3 - dimethyl - $\Delta^3$ - butenyl; and 1-methyl-1-ethyl-$\Delta^2$-propenyl; and similarly, the various isomers of heptenyl, octenyl, nonenyl, decenyl, undecenyl, dodecenyl, tridecenyl, tetradecenyl, pentadecenyl, hexadecenyl, heptadecenyl, octodecenyl, nondecenyl, eicosenyl, and the like.

In addition, when the organic radical substituted in the cyclomatic group is a univalent aliphatic radical, it can be an aralkyl radical such as, for example, benzyl, $\alpha$-phenyl-ethyl, $\beta$-phenyl-ethyl, $\alpha$-phenyl-propyl, $\beta$-phenyl-propyl, $\gamma$-phenyl-propyl, $\alpha$-phenyl-isopropyl, $\beta$-phenyl-isopropyl, $\alpha$-phenyl-butyl, $\beta$-phenyl-butyl, $\gamma$-phenyl-butyl, $\delta$-phenyl-butyl, $\alpha$-phenyl-isobutyl, $\beta$-phenyl-isobutyl, $\gamma$-phenyl-isobutyl, $\alpha$-phenyl-sec-butyl, $\beta$-phenyl-sec-butyl, $\gamma$-phenyl-sec-butyl, $\beta$-phenyl-t-butyl, $\alpha$'-naphthyl-methyl, $\beta$'-naphthyl-methyl, $\alpha$-($\alpha$'-naphthyl)-ethyl, $\alpha$-($\beta$'-naphthyl)-ethyl, $\beta$-($\alpha$'-naphthyl)-ethyl, $\beta$-($\beta$'-naphthyl)-ethyl, $\alpha$-($\alpha$'-naphthyl)-propyl, $\alpha$-($\beta$'-naphthyl)-propyl, $\beta$-($\alpha$'-naph-
thyl) - propyl, $\beta$ - ($\beta$' - naphthyl) - propyl, $\gamma$-($\alpha$'-naphthyl)-propyl, $\gamma$-($\beta$'-naphthyl)-propyl, $\alpha$-($\alpha$'-naphthyl)-isopropyl, $\alpha$-($\beta$'-naphthyl)-isopropyl, $\alpha$-($\alpha$'-naphthyl)-butyl, $\alpha$-($\beta$'-naphthyl)-butyl, $\beta$-($\alpha$'-naphthyl)-butyl, $\beta$-($\beta$'-naphthyl)-butyl, $\gamma$-($\alpha$'-naphthyl)-butyl, $\gamma$-($\beta$'-naphthyl)-butyl, $\delta$-($\alpha$'-naphthyl)-butyl, $\alpha$-($\alpha$'-naphthyl)-isobutyl, $\alpha$-($\beta$'-naphthyl)-isobutyl, $\beta$ - ($\alpha$'- naphthyl) - isobutyl, $\beta$-($\beta$'-naphthyl)-isobutyl, $\gamma$-($\alpha$'-naphthyl)-isobutyl, $\gamma$-($\beta$'-naphthyl)-isobutyl, $\alpha$-($\alpha$'-naphthyl) - sec - butyl, $\alpha$-($\beta$'-naphthyl)-sec-butyl, $\beta$-($\alpha$'-naphthyl) - sec - butyl, $\beta$-($\beta$'-naphthyl)-sec-butyl, $\gamma$-($\alpha$'-naphthyl)-sec-butyl, $\gamma$-($\beta$'-naphthyl)-sec-butyl, $\beta$-($\alpha$-naphthyl)-t-butyl, $\beta$-($\beta$'-naphthyl)-t-butyl, the corresponding $\alpha$'- and $\beta$'-naphthyl derivatives of n-amyl and the various positional isomers thereof such as for example, said derivatives of 1-methyl-butyl, 2-methyl-butyl, 3-methyl-butyl, 1,1-dimethyl-propyl, 1,2-dimethyl-propyl, 2,2-dimethyl-propyl, 1-ethyl-propyl, and likewise said derivatives of the corresponding isomers of hexyl, heptyl, octyl, and the like, including eicosyl. Other such aralkyl radicals of the compounds of our invention include the $\alpha$'-, $\beta$'-, and $\gamma$'-anthryl derivatives of alkyl radicals, such as, for example, $\alpha$'-anthryl-methyl, $\alpha$-($\beta$'-anthryl)-ethyl, $\beta$-($\gamma$'-anthryl)-ethyl, $\alpha$-($\alpha$'-anthryl)-butyl, $\delta$-($\beta$'-anthryl)-2-methyl-amyl, and the like, and the corresponding alkyl derivatives of phenanthrene, fluorene, acenaphthene, chrysene, pyrene, triphenylene, naphthacene, and the like. Similarly, the univalent aliphatic radical substituted in the cyclomatic group of the compounds of our invention can be an aralkenyl radical such as, for example, $\alpha$-phenyl-ethenyl, $\beta$-phenyl-ethenyl, $\alpha$-phenyl-$\Delta^1$-propenyl, $\beta$-phenyl-$\Delta^1$-propenyl, $\gamma$-phenyl-$\Delta^1$-propenyl, $\alpha$-phenyl-$\Delta^2$-propenyl, $\beta$-phenyl-$\Delta^2$-propenyl, $\gamma$-phenyl-$\Delta^2$-propenyl, $\beta$-phenyl-isopropenyl, and similarly, the phenyl derivatives of the isomers of butenyl, pentenyl, hexenyl, heptenyl, and the like, up to and including about eicosenyl. Other such arylalkenyls include $\alpha$-($\alpha$'-naphthyl)-ethenyl, $\alpha$-($\beta$'-naphthyl)-ethenyl, $\beta$-($\alpha$'-naphthyl)-ethenyl, $\beta$ - ($\beta$'-naphthyl)-ethenyl, $\alpha$ - ($\alpha$'-naphthyl)-$\Delta^1$-propenyl, $\alpha$-($\beta$'-naphthyl)-$\Delta^1$-propenyl, $\beta$-($\alpha$'-naphthyl)-$\Delta^1$-propenyl, $\beta$-($\beta$'-naphthyl)-$\Delta^1$-propenyl, $\alpha$-($\alpha$'-naphthyl)-$\Delta^2$-propenyl, $\alpha$-($\beta$'-naphthyl) - $\Delta^2$ - propenyl, $\beta$-($\alpha$'-naphthyl)-$\Delta^2$-propenyl, $\beta$-($\beta$'-naphthyl)-$\Delta^2$-propenyl, $\alpha$-($\alpha$'-naphthyl)-isopropenyl, $\alpha$ - ($\beta$'-naphthyl)-isopropenyl, $\beta$-($\alpha$'-naphthyl)-isopropenyl, $\beta$-($\beta$'-naphthyl)-isopropenyl, and the like. In addition, such aromatic derivatives of alkenyls, that is, aralkenyl radicals include derivatives of phenanthrene, fluorene, acenaphthene, chrysene, pyrene, triphenylene, naphthacene, and the like.

When the organic radicals comprising the substituents in the cyclomatic groups of the compounds of our invention are univalent alicyclic radicals, these can be radicals selected from the group consisting of cycloalkyl and cycloalkenyl radicals. Thus, such univalent alicyclic radicals can be cycloalkyl radicals such as, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctodecyl, cyclonondecyl, cycloeicosyl, and such cycloaliphatic radicals as $\alpha$-cyclopropyl-ethyl, $\beta$-cyclopropyl-ethyl, $\alpha$-cyclobutyl-propyl, $\beta$-cyclobutyl-propyl, $\gamma$-cyclobutyl-propyl, $\alpha$-cycloamyl-isopropyl, $\beta$-cycloamyl-isopropyl, and the like. Similarly, the alicyclic radical substituents of the cyclomatic groups of the novel cyclomatic compounds of the present invention can be cycloalkenyl radicals such as, for example, $\alpha$-cyclohexyl-ethenyl, $\beta$-cyclohexyl-ethenyl, $\alpha$-cycloheptyl-$\Delta^1$-propenyl, $\beta$-cycloheptyl-$\Delta^1$-propenyl, $\gamma$-cycloheptyl-$\Delta^1$-propenyl, $\alpha$-cyclooctyl-$\Delta^2$-propenyl, $\beta$-cyclooctyl-$\Delta^2$-propenyl, $\gamma$-cyclooctyl-$\Delta^2$-propenyl, $\beta$ - cyclononyl-isopropenyl, $\alpha$ - methylene - $\beta$ - cyclododecyl-ethyl, and the like.

When the organic radicals substituted in the cyclomatic groups of our compounds are univalent aromatic radicals they can be selected from the group consisting of aryl and alkaryl radicals. Thus, these univalent aromatic radicals can be aryl radicals such as, for example, phenyl, α-naphthyl, β-naphthyl, α-anthryl, β-anthryl, γ-anthryl, and the like, including the various monovalent radicals of such aromatics as indene isoindene, acenaphthene, fluorene, phenanthrene, naphthacene, chrysene, pyrene, triphenylene, and the like. Moreover, these univalent aromatic radicals can be alkaryl radicals such as, for example, o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylpenyl, 2-methyl-α-naphthyl, 3-methyl-α-naphthyl, 4-methyl - α - naphthyl, 5 - methyl - α - naphthyl, 6 - methyl - α - naphthyl, 7 - methyl - α - naphthyl, 8-methyl - α-naphthyl, 1 - ethyl - β - naphthyl, 3 - ethyl - β - naphthyl, 4 - ethyl - β - naphthyl, 5 - ethyl - β - naphthyl, 6 - ethyl-β - naphthyl, 7 - ethyl - β - naphthyl, 8 - ethyl - β - naphthyl, 2,3-dipropyl-α-naphthyl, 5,8-diisopropyl-β-naphthyl, and the like.

Having amply described the meaning of the term "organic radical," the discussion with regard to cyclomatic radicals has been facilitated. As stated hereinabove, the cyclomatic groups of the compounds of the present invention can be represented by four general formulae. The first class of cyclomatic radicals can be represented by the general formula

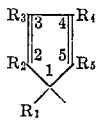

wherein each of $R_1$, $R_2$, $R_3$, $R_4$, and $R_5$ can be the same or different and is selected from the group consisting of hydrogen and organic radicals. Illustrative examples of such cyclomatic radicals include cyclopentadienyl, 1-methyl - cyclopentadienyl, 2,3 - dimethyl - cyclopentadienyl, 3 - ethyl - cyclopentadienyl, 1,3,4 - tripropyl - cyclopentadienyl, 1,5 - dipentyl - cyclopentadienyl, 2 - methyl-4 - tertiarybutyl - cyclopentadienyl, 3 - isopropenyl - cyclopentadienyl, 3,4 - di - ($\Delta^2$ - isobutenyl) - cyclopentadienyl, 3 - methyl - 5 - ($\Delta^1$ - pentenyl) - cyclopentadienyl, 3 - (β - phenylethyl) - cyclopentadienyl, 3-hexyl - 4-(β - phenylpropyl) - cyclopentadienyl, 2 - methyl - 3-($\Delta^1$ - propenyl) - 4 - (γ - phenylbutyl) - cyclopentadienyl, 3 - (β - phenylethenyl) - cyclopentadienyl, 3 - cyclohexyl - cyclopentadienyl, 3,4 - dicyclopropyl - cyclopentadienyl, 5 - (α - cyclohexyl - ethenyl) - cyclopentadienyl, 2 - phenyl - cyclopentadienyl, 1 - ethyl - 3 - (α - methyl)-cyclopentadienyl, 2 - (o - tolyl) - cyclopentadienyl, and the like.

The second type of cyclomatic radical is the indenyl type radical represented by the general formula

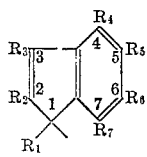

wherein each of $R_1$, $R_2$, $R_3$, $R_4$, $R_5$, $R_6$, and $R_7$ can be the same or different and is selected from the group consisting of hydrogen and organic radicals. Illustrative examples of such cyclomatic radicals include indenyl, 2-methyl - indenyl, 3 - sec - butyl - indenyl, 3,4 - diethenyl-indenyl, 5 - (α - phenylbutyl) - indenyl, 3 - methyl - 4-(β - phenylethyl) - indenyl, 6 - (phenylethenyl) - indenyl, 3 - cyclohexyl-indenyl, 2,5 - di - (α - cyclopropylethyl)-indenyl, 3 - phenyl - indenyl, 4,5 - di - phenyl - indenyl, 5 - (mesityl) - indenyl, 3 - (2,4 - xylyl) - indenyl, and the like.

The third type of cyclomatic radical of the new compositions of matter of the present invention is a radical of the fluorenyl type which can be represented by the general formula

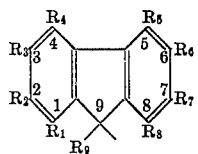

wherein each of $R_1$, $R_2$, $R_3$, $R_4$, $R_5$, $R_6$, $R_7$, $R_8$, and $R_9$ can be the same or different and is selected from the group consisting of hydrogen and organic radicals. Illustrative examples of such radicals include fluorenyl, 3-ethyl-fluorenyl, 4,5 - dipropyl - fluorenyl, 9 - methyl - fluorenyl, 6-ethenyl - fluorenyl, 4 - benzyl - fluorenyl, 2 - (β - phenylethenyl) - fluorenyl, 4,5 - di - (cyclooctyl) - fluorenyl, 3 - (β - cyclohexylethenyl) - fluorenyl, 3,6 - di - (phenyl)-fluorenyl, 2 - m - tolyl - fluorenyl, and the like.

The fourth type of cyclomatic radical, that is, a radical containing the cyclopentadienyl moiety can be represented by the general formula

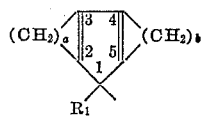

wherein $a$ and $b$ can be the same or different and are small whole integers including 0 and excluding 1, and wherein $R_1$ is selected from the class consisting of hydrogen and organic radicals. Thus, when $a$ is zero each of the carbon atoms designated as 2 and 3 have attached thereto a monovalent radical selected from the class consisting of hydrogen and organic radicals. Furthermore, the monovalent radicals so attached can be the same or different. The same discussion applies to each of the carbon atoms designated as 4 and 5 when $b$ is zero. Illustrative examples of this type of cyclomatic radical include 4,5,6,7-tetrahydroindenyl; 1,2,3,4,5,6,7,8 - octahydrofluorenyl; 3 - methyl - 4,5,6,7 - tetrahydroindenyl; 2 - ethyl - 3 - phenyl - 4,5, 6,7 - tetrahydroindenyl, and the like.

The third primary constituent of the new compositions of matter of the present invention is designated as an electron donating group. Such groups are represented by the symbols B and C in the aforementioned generic formula. For the sake of clarity, it is probable that the electron donating group can best be described by combining these groups according to the number of electrons they are capable of donating as shown in Table I.

TABLE I.—ELECTRON DONATING GROUPS

| Number Electrons Donated | Donating Group |
|---|---|
| 1 | H; R; CN. |
| 2 | CO; RR'CO; ROR'; ROH'; H₂O; RHCO; H₂S; RR'S; RR'SO; RSH; NH₃; NRR'R''; NXX'X''; RNOH; PXX'X''. |
| 3 | NO. |
| 4 | Butadiene, methylbutadiene. |

In the general formulae presented in Table I each of R, R', and R'' can be the same or different and is an organic radical of the type described hereinbefore. In addition, each of X, X', and X'' can be the same or different and is selected from the group consisting of fluorine, chlorine, bromine, and iodine, that is, it comprises a halogen.

The general methods for the preparation of the cyclomatic compounds of the instant invention comprise three types. The first type involves the introduction into a metallic compound of a cyclomatic group or groups, followed by the introduction into the resulting intermediate compound of secondary groups designated herein as electron donating groups. A variation of this first general type of reaction comprises reacting the desired metal in a suitable active form with a cyclomatic hydrocarbon or a metallic cyclomatic compound to form an intermediate metallic cyclomatic compound followed by the introduction therein of electron donating groups. The second general type of reactions for the preparation of the novel organometallic compounds of the present invention comprises concurrently introducing into either a metallic compound, a metal per se or an active form thereof, a cyclomatic group or groups and an electron donating group or groups. The third general method for preparing our cyclomatic compounds consists of introducing into a metallic compound containing the secondary or electron donating groups the cyclopentadienyl moiety-containing groups. The discussion hereinafter serves to elucidate each of these three general methods.

The first general method for the preparation of the new and novel cyclomatic compounds of the instant invention, that is, the method involving introducing into a metallic compound of the desired metal a cyclomatic group or groups followed by an electron donating group or groups, is generally conducted in two steps. The first step involves the formation of an intermediate cyclomatic metal compound by the reaction of an active cyclomatic metal compound, such as cyclomatic magnesium halides, cyclomatic alkali metal compounds, cyclomatic zinc halides and the like with a compound of the desired metal. The second step, which in this case is conducted subsequent to the first step, involves reacting the aforesaid intermediate compound with or without prior isolation in such a manner as to introduce therein the desired electron donating groups. The reactions involved in the second step of this general method can be conducted in either the liquid phase at atmospseric pressure or thereabove or in the gaseous or vapor phase under suitable conditions of temperature and pressure. The following illustrative reactions are typical of the first type of general method for the preparation of our cyclomatic compounds.

By reacting a cyclomatic Grignard reagent such as cyclopentadineyl magnesium bromide, with a titanium compound such as titanium tetrachloride in a liquid medium, for example, a mixture of ether and benzene, we can prepare as an intermediate compound, a di-(cyclopentadienyl) titanium halide. By subsequently reacting this intermediate compound with an alkyl or aryl Grignard reagent or an alkyl or aryl alkali metal compound, a polyalkyl or polyaryl di-(cyclopentadienyl) titanium is formed. Such a compound is illustrated by di-(cyclopentadienyl) titanium tetramethyl, di-(cyclopentadienyl) titanium tetraphenyl, di-(cyclopentadienyl) titanium diphenyl-diethyl, di-(indenyl) titanium tetramethyl, and the like. Likewise, we can prepare a cyclomatic copper carbonyl by essentially analogous reaction steps. More specifically, by reacting in a suitable liquid medium a copper compound such as cuprous chloride with an active cyclomatic compound such as a cyclomatic Grignard reagent or a cyclomatic alkali metal compound, we form an intermediate cyclomatic copper compound which then can be reacted with carbon monoxide, preferably under pressure, to form a cyclomatic copper carbonyl, such as cyclopentadienyl copper carbonyl. Other related processes will be apparent to those skilled in the art.

A variation of the first general type of reaction previously described consists essentially of modifying the first step of the two-step procedure. Thus, instead of utilizing as a starting material a compound of the desired metal to prepare an intermediate cyclomatic metallic compound, the latter can be prepared by the reaction of either a cyclomatic hydrocarbon, such as cyclopentadiene, or a cyclomatic radical-containing compound with the desired metal in a suitable active form, with or without a catalyst. The following reactions serve as illustrations of this alternate overall procedure.

By reacting manganese metal, preferably as a finely divided active powder, with a cyclomatic hydrocarbon such as cyclopentadiene with or without a catalyst under suitable conditions of temperature, we can prepare as an intermediate material a cyclomatic manganese compound such as di-(cyclopentadienyl) manganese. This intermediate compound can then be treated in the vapor phase with such substances as hydrogen, cyanogen and the like to form respectively cyclomatic manganese hydrides and cyclomatic manganese cyanides. Such compounds can be illustrated by the following: di-(cyclopentadienyl) manganese hydride, di-(cyclopentadienyl) manganese cyanide, and the like. Additional reactions of this type will become apparent to those skilled in the art.

The second general method for the preparation of the cyclomatic compounds of the present invention, that of concurrently introducing both cyclomatic and electron donating groups into a metallic compound, involves similar reactions to those described hereinbefore. However, the major difference between the two methods is essentially the point at which the secondary group is introduced into the reaction sequence, which in some cases is an extremely critical feature. Following are illustrative examples of the second type of reaction we can employ to prepare cyclomatic compounds.

By co-mingling in a suitable reaction vessel a copper compound, such as cuprous chloride, a cyclomatic Grignard reagent and carbon monoxide, which mixture is preferably maintained under pressure in excess of atmospheric pressure we obtain a cyclomatic copper carbonyl such as cyclopentadienyl copper carbonyl. Similarly, by introducing into a suitable reaction vessel a copper compound such as cuprous bromide a cyclomatic Grignard reagent and an organic amine such as, for example, trimethyl amine, triphenyl amine, and the like, we can prepare a cyclomatic copper organic amine compound having the general formula $CyCuNR_3$ wherein Cy is a cyclomatic group. Likewise, we can react a metal in a suitable active form such as finely divided manganese concurrently with both a cyclomatic hydrocarbon, such as cyclopentadiene, and cyanogen, under suitable conditions of temperature and pressure to prepare a di-(cyclomatic) manganese cyanide. Such a compound is illustrated by di-(cyclopentadienyl) manganese cyanide. By replacing the cyanogen of the previous reaction with hydrogen, we can prepare a cyclomatic manganese hydride such as, for example, di-(cyclopentadienyl) manganese hydride. Similarly, by concurrently reacting a metal such as copper with a cyclomatic hydrocarbon and carbon monoxide in the presence of an active metal catalyst, we can prepare a cyclomatic copper carbonyl, for example (2-methylcyclopentadienyl)-copper carbonyl. Other essentially analogous processes within the spirit and scope of the present invention will be apparent to those skilled in the art.

The third general method for the preparation of our new and novel cyclomatic compounds consists of reacting either a compound of the desired metal or the desired metal per se with a suitable reagent such that the desired coordinating or electron donating group or groups is introduced into the starting material. The resulting intermediate compound can then be reacted in situ or can be isolated and reacted with an active cyclomatic metallic compound such as a cyclomatic Grignard reagent or a cyclomatic alkali metal compound to prepare the desired compound. Such a reaction technique is described hereinafter.

By reacting a suitable copper compound such as cuprous chloride with an organic amine such as triethyl amine, triphenyl amine, and the like, the corresponding complex addition compound is formed. Such compounds can be exemplified by the dimeric substance possessing the general formula $CuCl \cdot NR_{3-2}$. This intermediate compound can then be reacted with a cyclomatic Grignard reagent, for example, cyclopentadienyl magnesium iodide to prepare a cyclomatic copper organic amine compound. Such a compound is illustrated by cyclopentadienyl copper-triethyl amine. Similarly, by reacting a suitable copper compound such as cuprous bromide with phosphorus trifluoride, a complex addition compound is formed. By reacting this addition compound with a cyclomatic Grignard reagent or a cyclomatic alkali metal compound, the corresponding cyclomatic copper phosphorus trifluoride compound, one of the embodiments of the present invention, can be prepared. An illustrative example of such a compound is cyclopentadienyl copper phosphorus trifluoride. Other variations within the contemplation of the present invention will become apparent to those skilled in the art.

The new compositions of matter of the present invention are still further illustrated by the following examples wherein all parts and percentages are by weight.

*Example I*

*Cyclopentadienyl-zinc-ethyl.*—To a stirred reaction vessel containing a solution of 126.5 parts of ethyl bromide in 200 parts of diethyl ether was added 28.2 parts of magnesium metal. The mixture was stirred at a temperature of 25° C. until the reaction was essentially complete whereupon the unreacted magnesium was removed by filtration. A 55 percent aliquot of this filtered reaction product was added to a solution of 39.6 parts of cyclopentadiene in 100 parts of diethyl ether. The resulting mixture was allowed to stand at a temperature of 25° C. for sixteen hours whereupon this mixture was added to a solution of 68 parts of anhydrous zinc chloride dissolved in 200 parts of diethyl ether. At the end of an addition period of about one-half hour a white slurry was obtained. To this mixture was added a 45 percent aliquot resulting from the reaction described hereinbefore between 126.5 parts of ethyl bromide dissolved in 200 parts of diethyl ether with 28.2 parts of magnesium. At the end of an addition period of one hour the pressure of the reaction vessel was reduced thereby effecting a removal of most of the excess of diethyl ether. To the resulting mixture was added 220 parts of benzene and the reaction vessel was again maintained at reduced pressure thereby effecting an essentially quantitative removal of the remaining ether and the benzene. The reaction vessel was then connected to a cold condenser and the system maintained at a reduced pressure. A total of 27 parts of a white solid having a melting point of between 66 and 68° C. was recovered by sublimation amounting to a recovery of approximately 33 percent. By analysis, this material was shown to contain 52.56 percent carbon, 6.38 percent hydrogen, and 40.7 percent zinc while the formula $C_7H_{10}Zn$ requires 52.65 percent carbon, 6.32 percent hydrogen, and 41.0 percent zinc.

*Example II*

*Cyclopentadienyl-zinc-phenyl.*—To a stirred reaction vessel containing 17.0 parts of magnesium metal and 100 parts of diethyl ether was added a solution of 76.3 parts of ethyl bromide in 100 parts of diethyl ether. The mixture was stirred at a temperature of 25° C. until the reaction was essentially complete whereupon the unreacted magnesium was removed by filtration. The filtered reaction solution was added to a solution of 39.6 parts of cyclopentadiene in 100 parts of diethyl ether. The resulting mixture was maintained at the reflux temperature with agitation for a period of six hours whereupon this mixture was added to a solution of 68.2 parts of anhydrous zinc chloride dissolved in 200 parts of diethyl ether. At the end of an addition period of about one-half hour a white slurry was obtained.

In a separate reaction vessel, a solution of 94.2 parts of bromobenzene in 100 parts of diethyl ether was added to 14.6 parts of magnesium metal in 100 parts of diethyl ether. The mixture was maintained at the reflux temperature with stirring for a period of one hour at which time the reaction was essentially complete whereupon the unreacted magnesium was removed by filtration. The filtered reaction solution obtained in the latter reaction was added to the white slurry obtained from the above reaction with anhydrous zinc chloride. At the end of an addition period of one hour the pressure of the reaction vessel was reduced thereby effecting a removal of most of the excess of diethyl ether. To the resulting mixture was added 200 parts of benzene and the reaction vessel was again maintained at reduced pressure thereby effecting an essentially quantitative removal of the remaining ether and the benzene. The reaction vessel was then connected to a cold condenser and the system maintained at a reduced pressure. A total of 9 parts of a white solid was recovered by sublimation amounting to a recovery of approximately 9 percent. This material did not inflame on exposure to air. When one part of this white crystalline solid was added to about 50 parts of water it decomposed very slowly as evidenced by the slow evolution of gas.

*Example III*

*Cyclopentadienyl-zinc-tertiary-butyl.*—To a stirred reaction vessel containing 17.0 parts of magnesium metal and 100 parts of diethyl ether was added a solution of 76.3 parts of ethyl bromide in 100 parts of diethyl ether. The mixture was stirred at a temperature of 25° C. until the reaction was essentially complete whereupon the unreacted magnesium was removed by filtration. The filtered reaction solution was added to a solution of 39.6 parts of cyclopentadiene in 100 parts of diethyl ether. The resulting mixture was maintained at the reflux temperature with agitation for a period of six hours, whereupon this mixture was added to a solution of 68.2 parts of anhydrous zinc chloride dissolved in 200 parts of diethyl ether. At the end of an addition period of about one-half hour a white slurry was obtained. In a separate reaction vessel, a solution of 55.5 parts of tertiary-butyl chloride in 100 parts of diethyl ether was added to 14.6 parts of magnesium metal in 100 parts of diethyl ether. The mixture was maintained at the reflux temperature with stirring for a period of one hour at which time the reaction was essentially complete whereupon the unreacted magnesium was removed by filtration. The filtered reaction solution obtained in the latter reaction was added to the white slurry obtained from the above reaction with anhydrous zinc chloride. At the end of an addition period of one hour the pressure of the reaction vessel was reduced thereby effecting a removal of most of the excess of diethyl ether. To the resulting mixture was added 200 parts of benzene and the reaction vessel was again maintained at reduced pressure thereby effecting an essentially quantitative removal of the remaining ether and the benzene. The reaction vessel was then connected to a cold condenser and the system maintained at a reduced pressure. A total of 7 parts of a white solid was recovered by sublimation amounting to a recovery of approximately 8 percent. This material did not inflame on exposure to air.

In each of the preceding examples the compound possesses an inert gas structure in the outer electron shell of the metal atom. Since zinc occurs in the fourth period of the periodic table the resulting cyclomatic compound of the present invention attains the electron configuration of the inert gas of that period, that is, krypton, atomic No. 36. Therefore, in the expression $$a_n + 5x + py + qz = S$$

S becomes 36. Since $a_n$ is within the parameters expressed by $(S_{n-1}+1)$ and $(S_n-6)$, that is, since the atomic number of zinc is within the parameters of 19 and 30 the atomic number of zinc, 30, can be substituted in the expression $a_n+5x+py+qz=36$. Since there is one cyclomatic radical in the compound, $x$ is equal to 1 and, likewise, since there is one electron donating group, $y$ is equal to 1 and $z$ is equal to 0. The electron donating group, the ethyl radical, donates one electron as shown by the listing of the donating groups in Table I hereinabove. Thus, the expression $a_n+5x+py+qz=36$ has been completely satisfied, that is, $$30+5(1)+1(1)+0=36$$

The preceding examples are merely illustrative of the broad class of metallic cyclomatic derivatives of the present invention. To more completely define the scope of the present invention, additional examples will be presented hereinafter. For convenience, these compounds are grouped according to the metallic atom present.

GROUP IA ELEMENTS

| $MA_xB_yC_r$ | $a_n+5x+py+qz=S$ |
|---|---|
| $(C_5H_5)Na(CO)$ | $11+5(1)+2(1)+0=18$ |
| $(C_5H_5)Na(PCl_3)$ | $11+5(1)+2(1)+0=18$ |
| $(C_5H_5)Li(H_2O)$ | $3+5(1)+2(1)+0=10$ |
| $(C_5H_5)_3Rb(C_2H_5)_2$ | $37+5(3)+1(2)+0=54$ |
| $(C_9H_7)_3K(NH_3)$ | $19+5(3)+2(1)+0=36$ |
| $(C_9H_7)_5Cs(CO)_2(H)_2$ | $55+5(1)+2(2)+1(2)=86$ |
| $(C_9H_7)Na(CH_3SH)$ | $11+5(1)+2(1)+0=18$ |
| $(C_{13}H_9)Li(CH_3)(H)$ | $3+5(1)+1(1)+1(1)=10$ |

GROUP IB ELEMENTS

| | |
|---|---|
| $(C_5H_5)Cu(CO)$ | $29+5(1)+2(1)+0=36$ |
| $(C_9H_7)Cu(PBr_3)$ | $29+5(1)+2(1)+0=36$ |
| $(C_{13}H_9)Cu(NI_3)$ | $29+5(1)+2(1)+0=36$ |
| $(C_5H_5)Cu(C_2H_5)(CH_3)$ | $29+5(1)+1(1)+1(1)=36$ |
| $(C_9H_7)Ag(CH_3OCH_3)$ | $47+5(1)+2(1)+0=54$ |
| $(C_5H_5)Ag(CH_3)(C_6H_5)$ | $47+5(1)+1(1)+1(1)=54$ |
| $(C_{13}H_9)Au(NH_3)$ | $79+5(1)+2(1)+0=86$ |
| $(C_5H_5)Au(C_3H_7)(H)$ | $79+5(1)+1(1)+1(1)=86$ |
| $(C_9H_7)Au(H)_2$ | $79+5(1)+2(1)+0=86$ |
| $(C_5H_5)Cu(H)_2$ | $29+5(1)+1(1)+0=36$ |

GROUP IIA ELEMENTS

| | |
|---|---|
| $(C_5H_5)BeH$ | $4+5(1)+1(1)+0=10$ |
| $(C_5H_5)Be(C_6H_5)$ | $4+5(1)+1(1)+0=10$ |
| $(C_9H_7)Mg(CH_3)$ | $12+5(1)+1(1)+0=18$ |
| $(C_5H_5)MgH$ | $12+5(1)+1(1)+0=18$ |
| $(C_5H_5)_2Ca(NO)_2$ | $20+5(2)+3(2)+0=36$ |
| $(C_5H_5)_3CaH$ | $20+5(3)+1(1)+0=36$ |
| $(C_5H_5)_2Ca(H_2C=CH-CH=CH_2)(H)_2$ | $20+5(2)+4(1)+1(2)=36$ |
| $(C_5H_5)_3Sr(C_2H_5)$ | $38+5(3)+1(1)+0=54$ |
| $(C_5H_5)_2Sr(NO)_2$ | $38+5(2)+3(2)+0=54$ |
| $(C_5H_5)_2Sr(CH_3SH)(H)_2$ | $38+5(2)+2(2)+1(2)=54$ |
| $(C_5H_5)_5Ba(NO)(H)_2$ | $56+5(5)+3(1)+1(2)=86$ |

GROUP IIB ELEMENTS

| | |
|---|---|
| $(C_5H_5)Zn(C_2H_5)$ | $30+5(1)+1(1)+0=36$ |
| $(C_5H_5)Zn(C_6H_5)$ | $30+5(1)+1(1)+0=36$ |
| $(C_9H_7)Zn(H)$ | $30+5(1)+1(1)+0=36$ |
| $(C_5H_5)Cd(CH_3)$ | $48+5(1)+1(1)+0=54$ |
| $(C_{13}H_9)Cd(H)$ | $48+5(1)+1(1)+0=54$ |
| $(C_5H_5)Hg(C_6H_5)$ | $80+5(1)+1(1)+0=86$ |
| $(C_9H_7)Hg(C_6H_5)$ | $80+5(1)+1(1)+0=86$ |

GROUP IIIB ELEMENTS

| | |
|---|---|
| $(C_5H_5)_2Sc(NO)(H)_2$ | $21+5(2)+3(1)+1(2)=36$ |
| $(C_5H_5)_2Sc(CH_3OH)(H)_3$ | $21+5(2)+2(1)+1(3)=36$ |
| $(C_5H_5)_2Y(NO)(CH_3)_2$ | $39+5(2)+3(1)+1(2)=54$ |
| $(C_5H_5)_5La(NO)(H)$ | $57+5(5)+3(1)+1(1)=86$ |
| $(C_5H_5)_5La(PBr_3)_2$ | $57+5(5)+2(2)+0=86$ |

GROUP IVB ELEMENTS

| | |
|---|---|
| $(C_5H_5)_2Ti(CO)_2$ | $22+5(2)+2(2)+0=36$ |
| $(C_5H_5)_2Ti(CO)(NH_3)$ | $22+5(2)+2(1)+2(1)=36$ |
| $(C_5H_5)_2Zr(NO)(H)$ | $40+5(2)+3(1)+1(1)=54$ |
| $(C_5H_5)_2Zr((CH_3)_2SO)_2$ | $40+5(2)+2(2)+0=54$ |
| $(C_5H_5)_2Hf(CO)_2$ | $72+5(2)+2(2)+0=86$ |
| $(C_5H_5)_2Hf(NO)(CH_3)$ | $72+5(2)+3(1)+1(1)=86$ |
| $C_5H_5Hf(H_2C=CH-CH=CH_2)_2(H)$ | $72+5(1)+4(2)+1(1)=86$ |

GROUP VB ELEMENTS

| | |
|---|---|
| $(C_5H_5)_2V(NO)$ | $23+5(2)+3(1)+0=36$ |
| $(C_5H_5)_2V(NH_3)(H)$ | $23+5(2)+2(1)+1(1)=36$ |
| $(C_9H_7)_2V(H)_3$ | $23+5(2)+1(3)+0=36$ |
| $(C_5H_5)_2Nb(C_2H_5)_3$ | $41+5(2)+1(3)+0=54$ |
| $(C_5H_5)Ta(H_2C=CH-CH=CH_2)_2$ | $73+5(1)+4(2)+0=86$ |

GROUP VIB ELEMENTS

| | |
|---|---|
| $(C_5H_5)_2Cr(H_2O_2)$ | $24+5(2)+2(1)+0=36$ |
| $(C_5H_5)_2Cr(C_4H_9)(H)$ | $24+5(2)+1(1)+1(1)=36$ |
| $(C_5H_5)Cr(H_2C=CH-CH=CH_2)(NO)$ | $24+5(1)+4(1)+3(1)=36$ |
| $(C_5H_5)_2Mo(CH_3NOH)$ | $42+5(2)+2(1)+0=54$ |
| $(C_5H_5)_2Mo(CH_3SC_2H_5)$ | $42+5(2)+2(1)+0=54$ |
| $(C_9H_7)(C_5H_5)W(NCl_2Br)$ | $74+5(2)+2(1)+0=86$ |
| $(C_5H_5)_2W(N(CH_3)_3)$ | $74+5(2)+2(1)+0=86$ |

GROUP VIIB ELEMENTS

| | |
|---|---|
| $(C_5H_5)_2Mn(H)$ | $25+5(2)+1(1)+0=36$ |
| $(C_9H_7)Mn(CO)_3$ | $25+5(1)+2(3)+0=36$ |
| $(C_{13}H_9)Mn(PBr_3)_3$ | $25+5(1)+2(3)+0=36$ |
| $(C_5H_5)(C_9H_7)Mn(CH_3)$ | $25+5(2)+1(1)+0=36$ |
| $(C_5H_5)_2Tc(H)$ | $43+5(2)+1(1)+0=54$ |
| $(C_5H_5)_2Tc(C_6H_5)$ | $43+5(2)+1(1)+0=54$ |
| $(C_5H_5)Tc(CO)_2(PCl_3)$ | $43+5(1)+2(2)+2(1)=54$ |
| $(C_9H_7)_2Re(H)$ | $75+5(2)+1(1)+0=86$ |
| $(C_5H_5)Re(H_2S)(CH_3SH)_2$ | $75+5(1)+2(1)+2(2)=86$ |

GROUP VIII ELEMENTS

| | |
|---|---|
| $(C_5H_5)Fe(CO)_2(H)$ | $26+5(1)+2(2)+1(1)=36$ |
| $(C_5H_5)Fe(CH_3SOCH_3)_2(H)$ | $26+5(1)+2(2)+1(1)=36$ |
| $(C_9H_7)Ru(CH_3OH)_2(CH_3)$ | $44+5(1)+2(2)+1(1)=54$ |
| $(C_5H_5)Ru(CO)(NO)$ | $44+5(1)+2(1)+3(1)=54$ |
| $(C_{13}H_9)Os(H)_5$ | $76+5(1)+1(5)+0=86$ |
| $(C_5H_5)Os(CH_3)_2(PI_3)$ | $76+5(1)+1(3)+2(1)=86$ |
| $(C_5H_5)Co(CO)_2$ | $27+5(1)+2(2)+0=36$ |
| $(C_5H_5)Co(CO)(NH_3)$ | $27+5(1)+2(1)+2(1)=36$ |
| $(C_9H_7)Rh(C_2H_5OH)_2$ | $45+5(1)+2(2)+0=54$ |
| $(C_5H_5)Rh(NCl_3)(PCl_3)$ | $45+5(1)+2(1)+2(1)=54$ |
| $(C_{13}H_9)Ir(PI_3)_2$ | $77+5(1)+2(2)+0=86$ |
| $(C_5H_5)Ir(NO)(H)$ | $77+5(1)+3(1)+1(1)=86$ |
| $(C_5H_5)Ni(NO)$ | $28+5(1)+3(1)+0=36$ |
| $(C_5H_5)Ni(CO)(C_2H_5)$ | $28+5(1)+2(1)+1(1)=36$ |
| $(C_9H_7)Pd(H)_3$ | $46+5(1)+1(3)+0=54$ |
| $(C_5H_5)Pd(CH_3)_2(H)$ | $46+5(1)+1(2)+1(1)=54$ |
| $(C_5H_5)Pt(CH_3)_3$ | $78+5(1)+1(3)+0=86$ |
| $(C_{13}H_9)Pt(NO)$ | $78+5(1)+3(1)+0=86$ |

In the above listing of illustrative examples of the novel cyclomatic compounds of the present invention, the cyclomatic radicals are shown by their empirical formulae. Thus, $C_5H_5$ represents a cyclopentadienyl radical, and $C_9H_7$ and $C_{13}H_9$ denote respectively an indenyl and fluorenyl radical. It is to be understood, however, that any of the four general types of cyclomatic radicals described hereinbefore can be employed in the compounds of the present invention.

As mentioned hereinbefore, a particular advantage of the new compositions of matter of the present invention is the fact that by proper selection of the individual groups comprising such compositions compounds having "tailor made" characteristics can be obtained. Thus, by the proper selection of the metallic atom, the cyclomatic group and the electron donating group, it is possible to prepare compounds possessing differing degrees of stability, volatility, and solubility. Likewise, the selection of these constituents also enables the preparation of compounds of diverse applicability.

The cyclomatic compounds of the present invention possess particular utility as additives. Thus, many of the cyclomatic derivatives can be used as fuel additives such as for fuels for internal combustion engines of both the spark ignition and compression ignition types, fuels for jet engines and rocket fuels, and the like. Likewise, many of the cyclomatic compounds of the present invention can be successfully employed as additives to natural and synthetic lubricants as well as the more viscous unctuous materials exemplified by natural and synthetic greases and the like.

Other important uses of the cyclomatic compounds of the present invention include the use thereof as chemical intermediates, particularly in the preparation of metal and metalloid containing polymeric materials. In addition, some of the cyclomatic derivatives of this invention can be used in the manufacture of medicinals and other therapeutic materials as well as agricultural chemicals such as, for example, fungicides, insecticides, defoliants, growth regulants and so on.

Having fully described the novel cyclomatic derivatives of the present invention, the need therefor, and the best

We claim:

1. A compound having a cyclopentadienyl group coordinated with a metal of atomic number of at least 6 less than that of the next higher rare gas, the compound being stabilized by additional coordination with at least one different electron donating group capable of donating from 1 through 4 electrons, the sum of all coordinated electrons and the atomic number of said metal being equal to the atomic number of said next higher rare gas.

2. A compound having a cycopentadienyl group coordinated with a metal having an atomic number from 6 through 13 less than that of the next higher rare gas, the compound being stabilized by additional coordination with at least one different electron donating group capable of donating from 1 through 4 electrons, the sum of all coordinated electrons and the atomic number of said metal being equal to the atomic number of said next higher rare gas.

3. A compound as defined by claim 2 in which the metal is cobalt.

4. A compound as defined by claim 2 in which the metal is nickel.

5. A compound as defined by claim 2 in which the metal is copper.

6. A compound as defined by claim 2 in which the metal is zinc.

7. A compound as defined by claim 6 which is cyclopentadienyl zinc phenyl.

8. A compound as defined by claim 1 in which the additional coordination is with at least one carbonyl group.

9. A compound as defined by claim 8 in which the metal is manganese.

References Cited in the file of this patent

UNITED STATES PATENTS

| | | |
|---|---|---|
| 2,272,133 | Shappirio | Feb. 3, 1942 |
| 2,356,476 | Shappirio | Aug. 22, 1944 |
| 2,563,074 | Schmerling | Aug. 7, 1951 |
| 2,680,756 | Pauson | June 8, 1954 |
| 2,680,758 | Thomas | June 8, 1954 |
| 2,683,157 | Weinmayr | July 6, 1954 |

OTHER REFERENCES

Miller: Jour. Chem. Soc., London (February 1952), pages 632–635.

Fischer et al.: Zeitschrift für Naturforschung, Band 7B, Heft 7, July 19, 1952, pages 377–379.

Woodward: Jour. Am. Chem. Soc., vol. 74 (1952), pages 3458–9.

Thiele: Ber., vol. 34, pages 68–71.

Wooster: Chem. Rev., vol. 11, page 31.